US009366922B2

(12) United States Patent
Jia et al.

(10) Patent No.: US 9,366,922 B2
(45) Date of Patent: Jun. 14, 2016

(54) THIN FILM TRANSISTOR ARRAY AND METHOD FOR MANUFACTURING THE SAME

(75) Inventors: Pei Jia, Shenzhen (CN); Liu-yang Yang, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 172 days.

(21) Appl. No.: 13/391,277

(22) PCT Filed: Feb. 8, 2012

(86) PCT No.: PCT/CN2012/070949
§ 371 (c)(1),
(2), (4) Date: Feb. 17, 2012

(87) PCT Pub. No.: WO2013/116994
PCT Pub. Date: Aug. 15, 2013

(65) Prior Publication Data
US 2013/0200385 A1 Aug. 8, 2013

(30) Foreign Application Priority Data

Feb. 7, 2012 (CN) .......................... 2012 1 0025868

(51) Int. Cl.
*H01L 33/08* (2010.01)
*H01L 27/12* (2006.01)
*G02F 1/1362* (2006.01)
*G02F 1/1343* (2006.01)

(52) U.S. Cl.
CPC .... *G02F 1/1362* (2013.01); *G02F 2001/13625* (2013.01); *G02F 2001/134372* (2013.01)

(58) Field of Classification Search
CPC ... H01L 33/08; H01L 21/00; H01L 21/32139; H01L 21/3144; H01L 27/1214; H01L 27/12; H01L 27/153
USPC .............. 257/72, 66, 49, 59; 438/34, 30, 149, 438/151, 152, 153
See application file for complete search history.

(56) References Cited

U.S. PATENT DOCUMENTS

| 5,585,951 | A | * | 12/1996 | Noda ................ G02F 1/136227 349/122 |
| 6,261,880 | B1 | * | 7/2001 | Wu ........................ G02F 1/1368 257/E21.414 |
| 7,833,075 | B2 | * | 11/2010 | Oh et al. ......................... 445/24 |
| 2003/0085406 | A1 | * | 5/2003 | Cheng ............................. 257/72 |
| 2004/0089900 | A1 | * | 5/2004 | Ishikawa et al. .............. 257/347 |
| 2006/0022199 | A1 | * | 2/2006 | Ishiga et al. ..................... 257/59 |
| 2007/0013773 | A1 | * | 1/2007 | Tsuchiya et al. ................ 348/87 |
| 2007/0166894 | A1 | * | 7/2007 | Lim ............................... 438/151 |
| 2008/0113461 | A1 | * | 5/2008 | Tung et al. ...................... 438/30 |
| 2009/0029527 | A1 | * | 1/2009 | Amundson et al. ........... 438/464 |
| 2009/0101908 | A1 | * | 4/2009 | Kwack .............. G02F 1/136286 257/59 |
| 2009/0111198 | A1 | * | 4/2009 | Fujikawa et al. ............... 438/22 |

(Continued)

*Primary Examiner* — Evan Pert
*Assistant Examiner* — Damon Hillman

(57) ABSTRACT

The present invention provides a thin film transistor (TFT) array substrate and a method for manufacturing the same. A transparent and electrically conductive layer and a first metal layer are deposited on a substrate, and a first multi tone mask is utilized to form gate electrodes and common electrodes. A gate insulating layer, a semiconductor layer and a second metal layer are deposited on the substrate, and a second multi tone mask is utilized to form source electrodes, drain electrodes and pixel electrodes. The present invention can simplify the manufacturing process thereof.

15 Claims, 2 Drawing Sheets

(56) References Cited

U.S. PATENT DOCUMENTS

| | | | |
|---|---|---|---|
| 2011/0114942 A1* | 5/2011 | Akimoto et al. | 257/43 |
| 2012/0061665 A1* | 3/2012 | Miyake et al. | 257/43 |
| 2012/0194262 A1* | 8/2012 | Uochi | 327/534 |
| 2012/0241408 A1* | 9/2012 | Misaki | 216/20 |
| 2013/0001579 A1* | 1/2013 | Jung et al. | 257/72 |
| 2013/0029441 A1* | 1/2013 | Hsu et al. | 438/30 |

* cited by examiner

THIN FILM TRANSISTOR ARRAY AND METHOD FOR MANUFACTURING THE SAME

FIELD OF THE INVENTION

The present invention relates to a field of a manufacturing technology for liquid crystal displays (LCDs), and more particularly to a thin film transistor (TFT) array substrate and a method for manufacturing the same.

BACKGROUND OF THE INVENTION

In accordance with a development of LCDs, a high display performance of the LCDs is required.

In a fringe field switching (FFS) technology, it is gradually applicable to the LCD field due to the characteristics of a high transmittance and a broad viewing angle In a process for fabricating a TFT array substrate of a FFS mode LCD, numerous masks are required to execute photolithography processes. However, the masks for photolithography are very expensive. The more the number of the masks is, the higher the cost for fabricating the TFT is. Furthermore, more masks will result in longer process time and more complicated process.

Therefore, in the conventional technology, it is more complicated to fabricate the TFT array substrate of the FFS mode LCDs by using the masks (such as four masks), resulting in more difficulty and higher cost for manufacturing the LCDs.

SUMMARY OF THE INVENTION

An object of the present invention is to provide a method for manufacturing a TFT array substrate, so as to solve a problem that the process of manufacturing a TFT array substrate of an FFS mode LCD by using numerous masks is too complicated, resulting in more difficulty and higher cost for manufacturing the LCD.

For solving the above-mentioned problem, the present invention provides a method for manufacturing a TFT array substrate. The method comprises the following steps: providing a substrate; sputtering a transparent and electrically conductive layer and a first metal layer on the substrate in sequence and utilizing a first multi tone mask to pattern the transparent and electrically conductive layer and the first metal layer, so as to form gate electrodes and common electrodes, wherein the gate electrodes are formed by patterning the transparent and electrically conductive layer and the first metal layer, and the common electrodes are formed by patterning the transparent and electrically conductive layer; depositing a gate insulating layer, a semiconductor layer and a second metal layer on the substrate in sequence, and utilizing a second multi tone mask to pattern the semiconductor layer and the second metal layer, so as to form pixel electrodes by patterning the semiconductor layer and the second metal layer on the gate insulating layer corresponding to the common electrodes, and to keep portions of the semiconductor layer above the gate electrodes, and to form source electrodes and drain electrodes on the patterned semiconductor layer by patterning the second metal layer; and depositing a planarization layer on the pixel electrodes, and the source electrodes, the drain electrodes and the semiconductor layer of TFTs, wherein the planarization layer is made of a transparent insulating material.

In the method for manufacturing the TFT array substrate of the present invention, the first multi tone mask and the second multi tone mask are gray tone masks (GTM), stacked layer masks (SLM) or half tone masks (HTM).

In the method for manufacturing the TFT array substrate of the present invention, the gate insulating layer and the semiconductor layer are deposited by using a chemical vapor deposition method.

In the method for manufacturing the TFT array substrate of the present invention, the second metal layer is deposited by sputtering.

In the method for manufacturing the TFT array substrate of the present invention, the first metal layer is a combination of a first aluminum metal layer and a first molybdenum metal layer, and the second metal layer is a combination of a second molybdenum metal layer, a second aluminum metal layer and a third molybdenum metal layer.

In the method for manufacturing the TFT array substrate of the present invention, during the process of utilizing the first multi tone mask to pattern the transparent and electrically conductive layer and the first metal layer for forming the gate electrodes and the common electrodes, the first metal layer is etched by using a mixed solution of nitric acid, phosphoric acid and acetic acid, and the transparent and electrically conductive layer is etched by using a oxalic acid solution.

In the method for manufacturing the TFT array substrate of the present invention, during the process of utilizing the second multi tone mask to form the source electrodes, the drain electrodes and the pixel electrodes, the second metal layer is etched by using a mixed solution of nitric acid, phosphoric acid and acetic acid, and the semiconductor layer is etched by a reactive ion etching (RIE).

Another object of the present invention is to provide a method for manufacturing a TFT array substrate, so as to solve a problem that the process of manufacturing a TFT array substrate of an FFS mode LCD by using numerous masks is too complicated, resulting in more difficulty and higher cost for manufacturing the LCD.

For solving the above-mentioned problem, the present invention provides a method for manufacturing a TFT array substrate. The method comprises the following steps: providing a substrate; depositing a transparent and electrically conductive layer and a first metal layer on the substrate in sequence and utilizing a first multi tone mask to pattern the transparent and electrically conductive layer and the first metal layer, so as to form gate electrodes and common electrodes, wherein the gate electrodes are formed by patterning the transparent and electrically conductive layer and the first metal layer, and the common electrodes are formed by patterning the transparent and electrically conductive layer; and depositing a gate insulating layer, a semiconductor layer and a second metal layer on the substrate in sequence, and utilizing a second multi tone mask to pattern the semiconductor layer and the second metal layer, so as to form pixel electrodes by patterning the semiconductor layer and the second metal layer on the gate insulating layer corresponding to the common electrodes, and to keep portions of the semiconductor layer above the gate electrodes, and to form source electrodes and drain electrodes on the patterned semiconductor layer by patterning the second metal layer.

In the method for manufacturing the TFT array substrate of the present invention, after forming the source electrodes, the drain electrodes and the pixel electrodes, the method further comprises the following step: depositing a planarization layer on the pixel electrodes, and the source electrodes, the drain electrodes and the semiconductor layer of TFTs, wherein the planarization layer is made of a transparent insulating material.

In the method for manufacturing the TFT array substrate of the present invention, the first multi tone mask and the second multi tone mask are gray tone masks (GTM), stacked layer masks (SLM) or half tone masks (HTM).

In the method for manufacturing the TFT array substrate of the present invention, the transparent and electrically conductive layer and the first metal layer are deposited by sputtering.

In the method for manufacturing the TFT array substrate of the present invention, the gate insulating layer and the semiconductor layer are deposited by using a chemical vapor deposition method.

In the method for manufacturing the TFT array substrate of the present invention, the second metal layer is deposited by sputtering.

In the method for manufacturing the TFT array substrate of the present invention, the first metal layer is a combination of a first aluminum metal layer and a first molybdenum metal layer, and the second metal layer is a combination of a second molybdenum metal layer, a second aluminum metal layer and a third molybdenum metal layer.

In the method for manufacturing the TFT array substrate of the present invention, during the process of utilizing the first multi tone mask to pattern the transparent and electrically conductive layer and the first metal layer for forming the gate electrodes and the common electrodes, the first metal layer is etched by using a mixed solution of nitric acid, phosphoric acid and acetic acid, and the transparent and electrically conductive layer is etched by using a oxalic acid solution.

In the method for manufacturing the TFT array substrate of the present invention, during the process of utilizing the second multi tone mask to form the source electrodes, the drain electrodes and the pixel electrodes, the second metal layer is etched by using a mixed solution of nitric acid, phosphoric acid and acetic acid, and the semiconductor layer is etched by a RIE.

Still another object of the present invention is to provide a TFT array substrate, so as to solve a problem that the process of manufacturing a TFT array substrate of an FFS mode LCD by using numerous masks is too complicated, resulting in more difficulty and higher cost for manufacturing the LCD.

For solving the above-mentioned problem, the present invention provides a TFT array substrate. The TFT array substrate comprising: a substrate; a plurality of TFTs disposed on the substrate, wherein each of the TFTs comprises a gate electrode, a gate insulating layer, a semiconductor layer, a source electrode and a drain electrode, and the gate electrode, the gate insulating layer, the semiconductor layer, the source electrode and the drain electrode are formed on the substrate in sequence, and the gate electrode comprises a portion of a transparent and electrically conductive layer and a first metal layer, and the source electrode and the drain electrode are formed on the semiconductor layer by pattering a second metal layer; a plurality of common electrodes formed on the substrate by patterning the transparent and electrically conductive layer; and a plurality of pixel electrodes formed on the gate insulating layer and corresponding to the common electrodes by patterning the semiconductor layer and the second metal layer, wherein the pixel electrodes are connected to the drain electrodes of the TFTs.

In the TFT array substrate of the present invention, the first metal layer is a combination of a first aluminum metal layer and a first molybdenum metal layer, and the second metal layer is a combination of a second molybdenum metal layer, a second aluminum metal layer and a third molybdenum metal layer.

Compared with the conventional technology, in the present invention, the first multi tone mask is utilized to pattern the transparent and electrically conductive layer and the first metal layer on the substrate, and the second multi tone mask is utilized to pattern the gate insulating layer, the semiconductor layer and the second metal layer on the substrate, thereby forming the TFT array substrate. Obviously, the present invention can use only two masks to manufacture the TFT array substrate of an FFS mode LCD apparatus for reducing an amount of the required masks in the fabrication process, hence reducing the cost and time of the fabrication process, and improving a production capacity of the LCD apparatus.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
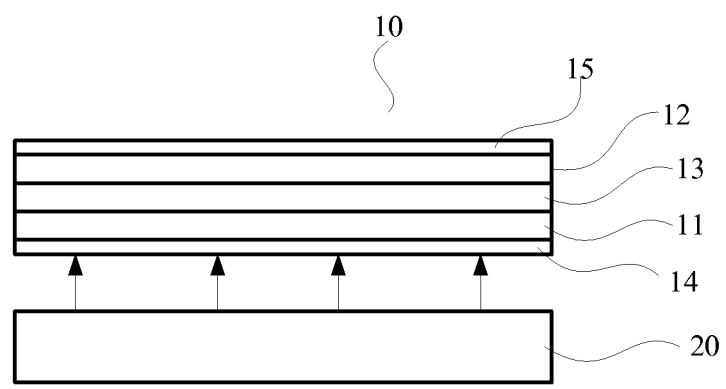
FIG. 1 is a cross-sectional view showing a display panel and a backlight module according to a preferred embodiment of the present invention.

The following embodiments are referring to the accompanying drawings for exemplifying specific performable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a cross-sectional view showing a display panel and a backlight module according to an embodiment of the present invention is illustrated. The method of the present embodiment for manufacturing a TFT array substrate can be applicable to the fabrication of the display panel 10, such as a liquid crystal display panel. When utilizing the display panel 10 of the present embodiment to fabricate a display apparatus, the display panel 10 may be disposed on the backlight module 20, thereby forming a liquid crystal display apparatus. The display panel 10 may comprise a first substrate 11, a second substrate 12, a liquid crystal layer 13, a first polarizer 14 and a second polarizer 15. The first substrate 11 and the second substrate 12 may be realized as glass substrates or flexible plastic substrates. In this embodiment, the first substrate 11 may be, for example, a TFT array substrate, and the second substrate 12 may be, for example, a color filter (CF) substrate. It notes that the CF and the TFT array may also be disposed on the same substrate in other embodiments.

Referring to FIG. 1 again, the liquid crystal layer 13 is formed between the first substrate 11 and the second substrate 12. The first polarizer 14 is disposed on one side of the first substrate 11 and opposite to the liquid crystal layer 13 (as a light-incident side). The second polarizer 15 is disposed on one side of the second substrate 12 and opposite to the liquid crystal layer 13 (as a light-emitting side).

Referring to FIG. 2A through FIG. 2D, schematic flow diagrams showing a process for manufacturing a TFT array substrate according to a preferred embodiment of the present invention are illustrated.

Referring to FIG. 2A again, a substrate 110 is provided, and a transparent and electrically conductive layer 120 and a first metal layer 130 are deposited on the substrate 111 in sequence.

The transparent and electrically conductive layer 120 is preferably made of a transparent and electrically conductive material, such as ITO, TO, IZO and ITZO.

The first metal layer 130 is preferably a combination of a first aluminum metal layer and a first molybdenum metal layer, and certainly, other materials are also allowable, such as Al, Ag, Cu, Mo, Cr, W, Ta, Ti, metal nitride or any alloys thereof. Furthermore, the first metal layer may be a multi-layer structure with heat-resistant film and lower resistance film.

Figure 2A:
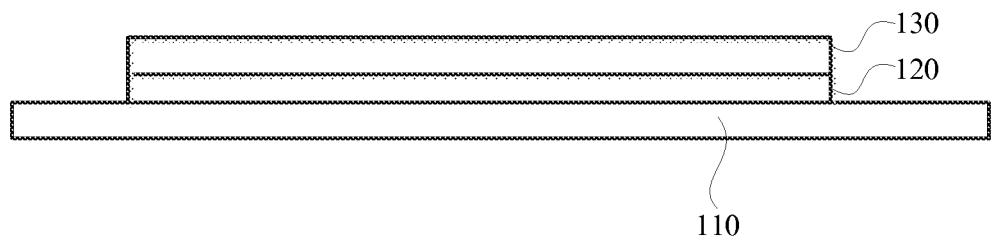
FIGS. 2A-2D are schematic flow diagrams showing a process for manufacturing a TFT array substrate according to the preferred embodiment of the present invention.

Referring to FIG. 2B again, a first multi tone mask is utilized to pattern the transparent and electrically conductive layer 120 and the first metal layer 130 shown in FIG. 2A, so as to form gate electrodes 140 and common electrodes 121, wherein the gate electrodes 140 are formed by patterning the transparent and electrically conductive layer 120 and the first metal layer 130, and the common electrodes 121 are formed by patterning the transparent and electrically conductive layer 130.

In practice, the transparent and electrically conductive layer 120 and the first metal layer 130 are preferably formed on the substrate 110 by sputtering. Subsequently, by using the first multi tone mask to perform a photolithography process and an etching process, the transparent and electrically conductive layer 120 and the first metal layer 130 are patterned to form the gate electrodes 140, and the transparent and electrically conductive layer 120 is patterned to form the common electrodes 121 on the substrate 110.

Figure 2B:
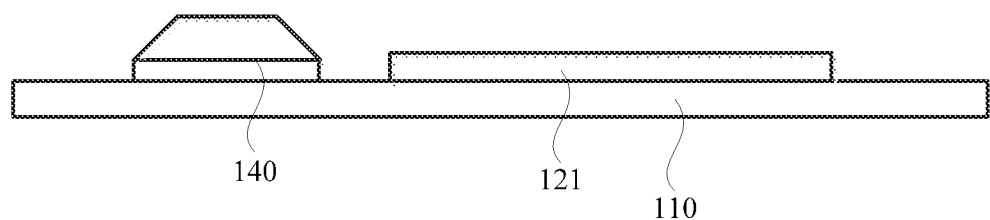
Figure 2C:
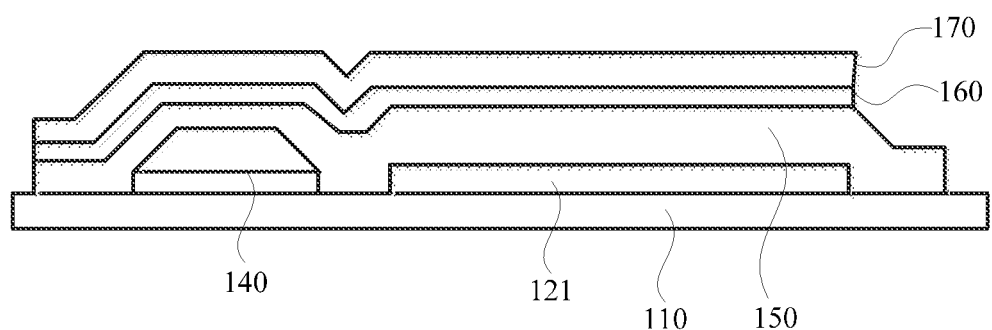

During the process of utilizing the first multi tone mask to pattern the transparent and electrically conductive layer 120 and the first metal layer 130 for forming the gate electrodes 140 and the common electrodes 121, the first metal layer 130 is preferably etched by using a mixed solution of nitric acid, phosphoric acid and acetic acid, and the transparent and electrically conductive layer 120 is preferably etched by using a oxalic acid solution, thereby forming the structure as shown in FIG. 2B. Certainly, the transparent and electrically conductive layer 120 and the first metal layer 130 can be etched by other wet etching, and the similarities are not mentioned for simplification.

In practice, the first multi tone mask may be a gray tone mask (GTM), a stacked layer mask (SLM) or a half tone mask (HTM). The multi tone mask can include partial exposure regions, non-exposure regions and full exposure regions, so as to pattern the transparent and electrically conductive layer 120 and the first metal layer 130 for forming the gate electrodes 140, and to pattern the transparent and electrically conductive layer 120 for forming the common electrodes 121.

Subsequently, referring to FIG. 2C again, a gate insulating layer 150, a semiconductor layer 160 and a second metal layer 170 are deposited on the substrate 110 in sequence.

In the present invention, the gate insulating layer 150 and the semiconductor layer 160 are preferably deposited by using a chemical vapor deposition method, such as plasma enhanced chemical vapor deposition (PECVD) method. Certainly, he gate insulating layer 150 and the semiconductor layer 160 may be deposited by using other methods, and the similarities are not mentioned for simplification.

The material of the gate insulating layer 150 may be silicon nitride ($SiN_x$) or silicon oxide ($SiO_x$). The semiconductor layer 160 is preferably made of polycrystalline silicon. In this embodiment, for forming the semiconductor layer 114, an amorphous silicon (a-Si) layer can be first deposited, and then a rapid thermal annealing step is performed to the a-Si layer, thereby allowing the a-Si layer to recrystallize into a polycrystalline silicon layer.

In practice, the second metal layer 170 is preferably deposited by sputtering. Preferably, the second metal layer 170 is a combination of a second molybdenum metal layer, a second aluminum metal layer and a third molybdenum metal layer, and certainly, other materials are also allowable, such as Al, Ag, Cu, Mo, Cr, W, Ta, Ti, metal nitride or any alloys thereof. Furthermore, the second metal layer may be a multi-layer structure with heat-resistant film and lower resistance film.

Subsequently, referring to FIG. 2D again, a second multi tone mask is utilized to pattern the semiconductor layer 160 and the second metal layer 170, so as to form pixel electrodes 180 by patterning the semiconductor layer 160 and the second metal layer 170 on the gate insulating layer 150 corresponding to the common electrodes 121, and to keep portions 161 of the semiconductor layer above the gate electrodes, and to form source electrodes 171 and drain electrodes 172 on the patterned semiconductor layer 161 by patterning the second metal layer 170. In this case, the pixel electrodes 180 are connected to the drain electrodes 172, and the common electrodes 121 and the pixel electrodes 180 are separated by the gate insulating layer 150.

In one embodiment, the second metal layer 170 may be made of a transparent and electrically conductive alloy, and the semiconductor layer 160 may be made of a transparent semiconductor material, so as to form the transparent pixel electrodes 180 for enhancing the aperture ratio of pixels of the display apparatus.

In this case, during the process of utilizing the second multi tone mask to form the source electrodes 171, the drain electrodes 172 and the pixel electrodes 180, the second metal layer 170 is preferably etched by using a mixed solution of nitric acid, phosphoric acid and acetic acid, and the semiconductor layer 160 is preferably etched by a dry etching, such as reactive ion etching (RIE).

In practice, the second multi tone mask may be a gray tone mask (GTM), a stacked layer mask (SLM) or a half tone mask (HTM). The multi tone mask can include partial exposure regions, non-exposure regions and full exposure regions, so as to form the pixel electrodes 180 by patterning the semiconductor layer 160 and the second metal layer 170 on the gate insulating layer 150 corresponding to the common electrodes 121, and to keep the portions 161 of the semiconductor layer above the gate electrodes 140, and to form the source electrodes 171 and the drain electrodes 172 on the patterned semiconductor layer 161 by patterning the second metal layer 170.

Figure 2D:
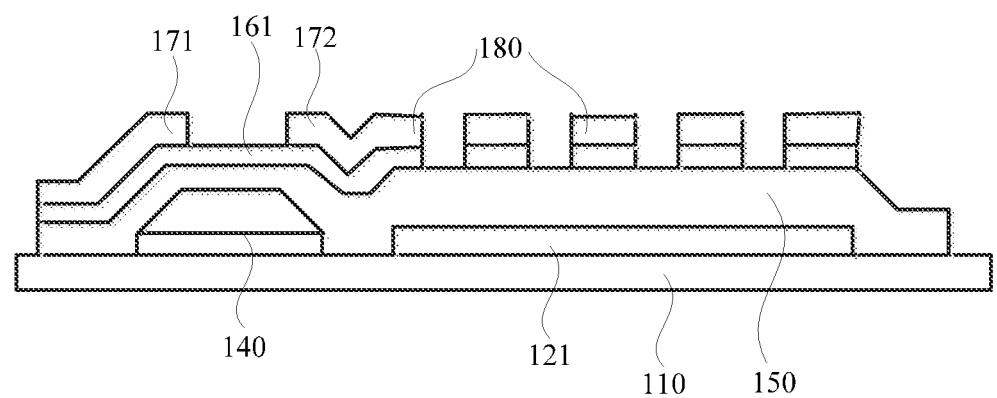

In one embodiment, after forming the structure as shown in FIG. 2D, a planarization layer (not shown) can be deposited on the pixel electrodes 180, and the source electrodes 171, the drain electrodes 172 and the patterned semiconductor layer 161 of TFTs for planarization and protecting devices. Preferably, the planarization layer is made of a transparent insulating material. Certainly, other materials are also allowable, and the similarities are not mentioned for simplification.

The present invention further provides a TFT array substrate. The TFT array substrate comprises the substrate 110, the plurality of common electrodes 121 and the plurality of TFTs disposed thereon.

Each of the TFTs comprises the gate electrode 140, the gate insulating layer 150, the semiconductor layer 161, the source electrode 171 and the drain electrode 172. The gate electrode 140, the gate insulating layer 150, the patterned semiconductor layer 161, the source electrode 171 and the drain electrode 172 are formed on the substrate 110 in sequence. The source electrode 171 and the drain electrode 172 are formed on the patterned semiconductor layer 161 by patterning the second metal layer 170.

The TFT array substrate further comprises the plurality pixel electrodes 180 and the plurality common electrodes 121. The common electrodes 121 are formed by patterning the transparent and electrically conductive layer 120 on the substrate 110. The pixel electrodes 180 are formed on the gate insulating layer 150 and correspond to the common electrodes 121 by patterning the semiconductor layer 160 and the second metal layer 170. The pixel electrodes 180 are connected to the drain electrodes 172 of the TFTs.

As described above, the methods of the present invention for manufacturing the TFT array substrate and the display panel can use only two masks (the first multi tone mask and the second multi tone mask) to manufacture the TFT array substrate of the FFS mode LCD apparatus for reducing an amount of the required masks in the fabrication process, hence reducing the cost and time of the fabrication process.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A method for manufacturing a thin film transistor (TFT) array substrate, comprising the following steps:
   providing a substrate;
   sputtering a transparent and electrically conductive layer and a first metal layer on the substrate in sequence and utilizing a first multi tone mask to pattern the transparent and electrically conductive layer and the first metal layer, so as to form gate electrodes and common electrodes, wherein the gate electrodes are formed by patterning the transparent and electrically conductive layer and the first metal layer, and the common electrodes are formed by patterning the transparent and electrically conductive layer; and
   depositing a gate insulating layer, a semiconductor layer and a second metal layer on the substrate in sequence, and utilizing a second multi tone mask to pattern the semiconductor layer and the second metal layer, so as to form pixel electrodes by patterning the semiconductor layer and the second metal layer on the gate insulating layer corresponding to the common electrodes, and to keep portions of the semiconductor layer above the gate electrodes, and to form source electrodes and drain electrodes on the patterned semiconductor layer by patterning the second metal layer;
   wherein the gate electrode and the common electrode are formed by the first multi tone mask, the pixel electrodes, source electrodes, drain electrodes are formed by the second multi tone mask.

2. The method for manufacturing the TFT array substrate according to claim 1, wherein the first multi tone mask and the second multi tone mask are gray tone masks (GTM), stacked layer masks (SLM) or half tone masks (HTM).

3. The method for manufacturing the TFT array substrate according to claim 1, wherein the gate insulating layer and the semiconductor layer are deposited by using a chemical vapor deposition method.

4. The method for manufacturing the TFT array substrate according to claim 1, wherein the second metal layer is deposited by sputtering.

5. The method for manufacturing the TFT array substrate according to claim 1, wherein the first metal layer is a combination of a first aluminum metal layer and a first molybdenum metal layer, and the second metal layer is a combination of a second molybdenum metal layer, a second aluminum metal layer and a third molybdenum metal layer.

6. The method for manufacturing the TFT array substrate according to claim 1, wherein, during the process of utilizing the first multi tone mask to pattern the transparent and electrically conductive layer and the first metal layer for forming the gate electrodes and the common electrodes, the first metal layer is etched by using a mixed solution of nitric acid, phosphoric acid and acetic acid, and the transparent and electrically conductive layer is etched by using a oxalic acid solution.

7. The method for manufacturing the TFT array substrate according to claim 1, wherein, during the process of utilizing the second multi tone mask to form the source electrodes, the drain electrodes and the pixel electrodes, the second metal layer is etched by using a mixed solution of nitric acid, phosphoric acid and acetic acid, and the semiconductor layer is etched by a reactive ion etching (RIE).

8. A method for manufacturing a TFT array substrate, comprising the following steps:
   providing a substrate;
   depositing a transparent and electrically conductive layer and a first metal layer on the substrate in sequence and utilizing a first multi tone mask to pattern the transparent and electrically conductive layer and the first metal layer, so as to form gate electrodes and common electrodes, wherein the gate electrodes are formed by patterning the transparent and electrically conductive layer and the first metal layer, and the common electrodes are formed by patterning the transparent and electrically conductive layer; and
   depositing a gate insulating layer, a semiconductor layer and a second metal layer on the substrate in sequence, and utilizing a second multi tone mask to pattern the semiconductor layer and the second metal layer, so as to form pixel electrodes by patterning the semiconductor layer and the second metal layer on the gate insulating layer corresponding to the common electrodes, and to keep portions of the semiconductor layer above the gate electrodes, and to form source electrodes and drain electrodes on the patterned semiconductor layer by patterning the second metal layer, the gate electrode and the common electrode are formed by the first multi tone mask, the pixel electrodes, source electrodes, drain electrodes are formed by the second multi tone mask.

9. The method for manufacturing the TFT array substrate according to claim 8, wherein the first multi tone mask and the second multi tone mask are gray tone masks (GTM), stacked layer masks (SLM) or half tone masks (HTM).

10. The method for manufacturing the TFT array substrate according to claim 8, wherein the transparent and electrically conductive layer and the first metal layer are deposited by sputtering.

11. The method for manufacturing the TFT array substrate according to claim 8, wherein the gate insulating layer and the semiconductor layer are deposited by using a chemical vapor deposition method.

12. The method for manufacturing the TFT array substrate according to claim 8, wherein the second metal layer is deposited by sputtering.

13. The method for manufacturing the TFT array substrate according to claim 8, wherein the first metal layer is a combination of a first aluminum metal layer and a first molybdenum metal layer, and the second metal layer is a combination of a second molybdenum metal layer, a second aluminum metal layer and a third molybdenum metal layer.

14. The method for manufacturing the TFT array substrate according to claim 8, wherein, during the process of utilizing the first multi tone mask to pattern the transparent and electrically conductive layer and the first metal layer for forming the gate electrodes and the common electrodes, the first metal layer is etched by using a mixed solution of nitric acid, phosphoric acid and acetic acid, and the transparent and electrically conductive layer is etched by using a oxalic acid solution.

15. The method for manufacturing the TFT array substrate according to claim 8, wherein, during the process of utilizing the second multi tone mask to form the source electrodes, the drain electrodes and the pixel electrodes, the second metal layer is etched by using a mixed solution of nitric acid, phosphoric acid and acetic acid, and the semiconductor layer is etched by a RIE.

* * * * *